Patented May 21, 1935

2,001,701

UNITED STATES PATENT OFFICE 2,001,701

1-NITRO-ANTHRAQUINONE-6-ACYL AMINO COMPOUNDS AND THEIR PREPARATION

Earl Edson Beard, Milwaukee, Wis., assignor to E. I. du Pont de Nemours & Company, Wilmington, Del., a corporation of Delaware No Drawing. Application February 3, 1932, Serial No. 590,640

10 Claims.  (Cl. 260—60)

This invention relates to carbon compounds and processes for their production. More particularly it relates to dye intermediates and colored compounds of the anthraquinone series. It especially contemplates compounds having the probable formula:

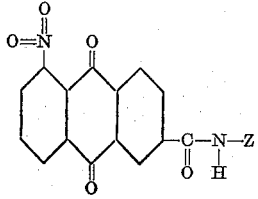

Z representing a carbon compound radical, residue or nucleus, and the production of such compounds from 1-nitro-anthraquinone-6-carboxylic acid.

Eckert in 1914 (Monats. fur Chemie 35 289) showed that by nitrating anthraquinone-beta-aldehyde and oxidizing the resultant nitro-anthraquinone-aldehyde that the compound 1-nitro-anthraquinone-6-carboxylic acid is produced.

An object of this invention is the production of new and valuable chemical compounds. Other objects are to produce new dye intermediates, new colored compounds, new chemical processes and in general to advance the art. Other objects will appear hereinafter.

These objects are accomplished by treating 1-nitro-anthraquinone-6-carboxylic acid in such a way as to produce a 1-nitro-anthraquinone-6-carbonyl-halide and thereafter condensing the resultant compound with an amine having at least one hydrogen atom attached to the amine nitrogen atom.

The invention will be further understood from a consideration of the following examples in which the parts are given by weight.

PREPARATION OF 1-NITRO-ANTHRAQUINONE-6-CARBONYL HALIDES

*Example I*

Ten (10) parts of 1-nitro-anthraquinone-6-carboxylic acid were suspended in 100 parts of benzene. Ten (10) parts of phosphorus pentachloride were added to the suspension and the hole heated at 80° C. for one hour. The reaction mixture was then cooled to 15° C. and filtered. The cake of the acid chloride was washed with benzene and dried.

The conversion of the acid to the carbonyl halide may be carried out in other solvents or suspension agents for example, ortho-di-chloro-benzene, nitro-benzene, toluene, mono-chloro-benzene and the tri-chloro benzenes or suitable mixtures of the compounds listed; and at other temperatures depending upon the particular agent used. Good results are also obtainable with solvent naphtha as a suspension agent. Particular mention may be made of thionyl chloride as an agent for the conversion to the desired compound. While any particular carbonyl halide may be produced especially good results are obtainable in the case of the chloride and the bromide.

If desired the phosphorus penta-halide may be prepared in the solvent to be used later for the conversion of the carboxylic acid to carbonyl halide. This may be accomplished for example by adding phosphorus tri-chloride to the solvent and then passing a stream of chlorine gas through the solution until the theoretical amount has been added or absorbed according to the equation $$PCl_3 + Cl_2 \rightarrow PCl_5$$

PREPARATION OF 1-NITRO-ANTHRAQUINONE-6-ACYL AMINO COMPOUNDS

*Example II*

Ten (10) parts of 1-nitro-anthraquinone-6-carbonyl chloride and 30 parts of aniline were heated together at 60–80° C. for ½–1 hour. The reaction mass was then treated with dilute hydrochloric acid to take up the excess aniline and the condensation product was filtered off. The resultant product was 1-nitro-anthraquinone-6-acid anilide in a very pure state.

*Example III*

Ten (10) parts of 1-nitro-anthraquinone-6-carbonyl chloride were added to 5 parts of aniline and the mixture agitated at 50–70° C. for 1 hour. Dilute hydrochloric acid was added to take up the aniline present in the resultant mass and the insoluble 1-nitro-anthraquinone-6-carboxylic acid anilide was filtered off.

The 1-nitro-anthraquinone-6-carboxylic-acid anilide when prepared in this way and dried is a gray to yellow mass. Its color in sulphuric acid is yellow. The vat solution is orange to red. It is characterized chemically by the ease of the reduction of the nitro group. This is accomplished by the ordinary reduction agents, for example, sodium sulphide and sodium sulfhydrate.

Example IV

Ten (10) parts of 1-nitro-anthraquinone-6-carbonyl chloride and 5 parts of para-amino-phenyl morpholine were mixed and agitated at 50–70° C. After one hour, dilute hydrochloric acid was added to take up any remaining para-amino-phenyl morpholine and the 1-nitro-anthraquinone-6-carbonyl-4'-amino-phenyl-morpholine removed by filtration.

This morpholine derivative gives a yellow sulphuric acid solution, a reddish-brown hydrosulphite vat and is characterized by having a readily reducible nitro group.

Example V

Ten (10) parts of 1-nitro-anthraquinone-6-carbonyl chloride and 10 parts of alpha naphthylamine were added to 50 parts of benzene and the resultant agitated at 50–70° C. for one hour. The resulting 1-nitro-anthraquinone-6-acylamino-alpha-naphthalene was filtered off. The resulting product gives a reddish-brown alkaline vat and a yellow sulphuric acid solution.

Example VI

Ten (10) parts of 1-nitro-anthraquinone-6-carbonyl chloride and 6.6 parts of 1-amino-anthraquinone were heated together in 100 parts of nitrobenzene at 140–150° C. for ½ hour. The reaction mass was cooled and filtered. The residue was washed with nitrobenzene and alcohol and then dried. A product giving yellow to orange sulphuric acid solutions and reddish-brown alkaline hydrosulphite vats resulted.

Example VII

Twenty (20) parts of 1-nitro-anthraquinone-6-carbonyl chloride and 7.5 parts of 1:5-di-amino-anthraquinone were heated together in 200 parts of nitrobenzene at 150–170° C. for 2–3 hours. The condensation product was filtered off at 80–100° C. and washed with nitrobenzene and alcohol. It vatted as an orange to red solution and dissolved in sulphuric acid coloring the solution yellow to orange.

Example VIII

Ten (10) parts of 1-nitro-anthraquinone-6-carbonyl chloride and 7 parts of 1:9-pyrazol-anthrone were heated together in 150 parts of nitrobenzene at 160–165° C. for 2 hours. The condensation product was filtered off at 70° C. and washed with nitrobenzene and alcohol. This process gives a product which dissolves in sulphuric acid coloring the resultant solution yellow to orange and vats as a reddish-brown solution.

Example IX

Ten (10) parts of 1-nitro-anthraquinone-6-carboxylic acid chloride and 7.5 parts of 1:9-anthraisothiazole-5-amine were heated together in 200 parts of nitrobenzene at 160° C. for 2 hours. The resultant product was filtered off at about 80° C. and washed with nitrobenzene and alcohol and thereafter dried. The product gives a yellow to orange color in sulphuric acid and a reddish-brown vat.

Example X

Thirty (30) parts of 1-nitro-anthraquinone-6-carbonyl chloride and 5 parts of meta-phenylene diamine were heated together in 500 parts of nitrobenzene at 150–160° C. for 2 hours. The condensation product was filtered off at 35–40° C. The filter residue was washed with nitrobenzene and thereafter with alcohol and finally dried. The product gives a yellow to amber sulphuric acid solution and produces a reddish-brown alkaline hydrosulphite vat.

Example XI

Ten (10) parts of 1-nitro-anthraquinone-6-carbonyl chloride and 7.8 parts of Bz-1-amino-benzanthrone were heated together in 200 parts of nitrobenzene at 160° C. for 2 hours. The resulting condensation product was filtered off at 70° C. and washed with nitrobenzene and alcohol. This product crystallizes in beautiful yellow needles from hot nitrobenzene. It gives a yellow to orange color in sulphuric acid and produces an orange to reddish-brown vat.

Example XII

Ten (10) parts of 1-nitro-anthraquinone-6-carbonyl chloride and 10.8 parts of mono-benzoyl-1:4-di-amino-anthraquinone were heated together in 125 parts of nitrobenzene at 150° C. for 2 hours. The condensation product was filtered off at 40–50° C. and washed with nitrobenzene and alcohol. This product gives an orange color in sulphuric acid and produces a bordeaux-red colored vat.

The invention is not limited to condensations involving the particular amines mentioned in the examples. In the general formula set out above, Z may represent any radical containing a carbon atom. The results obtainable with such acyclic amines as methyl-amine, methyl-ethyl-amine, ethylene-di-amine, di-butyl-amine; such carbocyclic amines as aniline, ethyl-aniline, naphthyl-phenyl-amine, alpha-naphthyl-amine, beta-naphthyl-amine, anisidine, para-phenylene-di-amine, meta-phenylene-di-amine, benzidine, 1-amino-anthraquinone, 2-amino-anthraquinone, mono-benzoyl-1:5-di-amino-anthraquinone, mono-benzoyl-1:4-di-amino-anthraquinone, 1:4-di-amino-anthraquinone, 1:5-di-amino-anthraquinone, 1,4,5,8-tetra-amino-anthraquinone, 1-amino-6-chloro-anthraquinone, mono-toluyl-1:5-di-amine, mono-para-methoxy-benzoyl-1:5-di-amino-anthraquinone, 1-amino-4-methoxy anthraquinone, 1-amino-2-bromo-anthraquinone, 1:5-di-amino-4-hydroxy-anthraquinone, 1:5-di-amino-4:8-di-hydroxy-anthraquinone, benzoyl-methyl-amino-(1)-anthraquinone-5-amine, 1:2-di-amino-anthraquinone, 1-amino-4-hydroxy-anthraquinone, 1-nitro-4-amino-anthraquinone, 1-amino-4-chloro-anthraquinone, Bz-1-amino-benzanthrone; and such heterocyclic amines as piperidine, 1:9-anthraisothiazole-4-amine, 1:9-anthraisothiazole-5-amine, 1:9-anthraisoselenazole-2-amine, mono-1:9-anthraisothiazoyl-1':5'-di-amino-anthraquinone, para-amino-phenyl-morpholine and 1:9-pyrazol-anthrone, merit special mention.

So far as now appears, the condensation of the 1-nitro-anthraquinone-6-carbonyl halide with the various amines may be carried out at any temperature up to the decomposition point of the reactants. Temperatures higher than ordinary room or atmospheric temperatures are usually used because of the influence of temperature on the speed of the reaction. High yields are to some extent dependent upon preferred temperature ranges which may be readily determined by one skilled in the art.

For this reason it will be obvious that the invention is not limited to the specific temperatures set out in the examples given.

The choice of solvent or suspension agent for carrying out the reaction depends largely upon the particular substances being reacted and the convenience of the person carrying out the reaction. This factor may readily be decided by one skilled in the art. In addition to the solvents listed in the specific examples, particular mention may be made of ortho-di-chloro-benzene, tri-chloro-benzene, solvent naphtha and nitrobenzene.

The time of the reaction, like the factors mentioned above, also depends upon the particular reactants. This factor may readily be determined empirically.

The compounds produced by this invention are colored and are valuable for the purpose of coloring various substances. These materials are also valuable as intermediates for vat and anthraquinone dyes.

As many apparently widely different embodiments may be made of this invention it is to be understood that I do not limit myself to the specific embodiments thereof except as defined in the appended claims.

I claim:

1. The process which comprises condensing a 1-nitro-anthraquinone-6-carbonyl halide with an amine containing at least one hydrogen atom attached to the amine nitrogen atom.

2. The process of claim 1 in which a primary amine is utilized.

3. The process of claim 1 in which a carbocyclic amine is utilized.

4. The chemical compound having the formula:

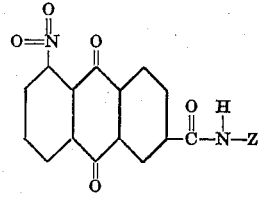

Z representing a carbocyclic radical.

5. The new dyes, dye intermediates and pigments, which may be produced by condensing 1-nitro-anthraquinone-6-carbonyl chloride with primary and secondary amines.

6. The chemical compound having the formula:

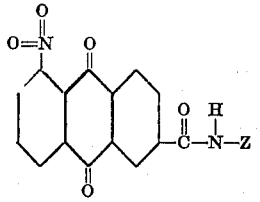

Z representing an anthraquinone radical.

7. The chemical compound having the formula:

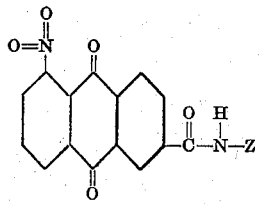

Z representing an amino-anthraquinone radical.

8. The chemical compound having the formula:

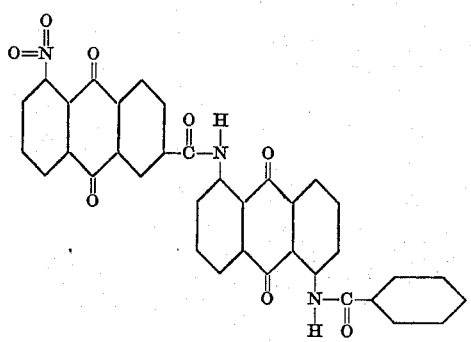

9. The chemical compound having the formula:

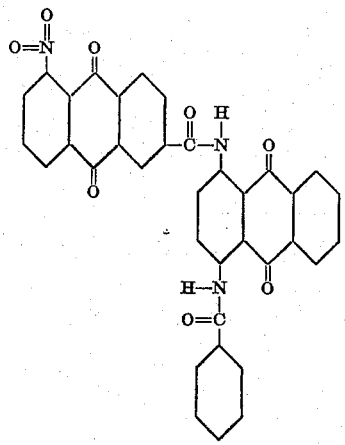

10. A chemical compound having the formula:

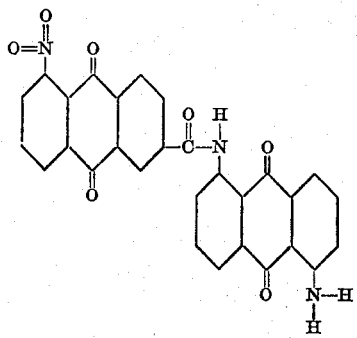

EARL EDSON BEARD.